US006892175B1

United States Patent
Cheng et al.

(10) Patent No.: US 6,892,175 B1
(45) Date of Patent: May 10, 2005

(54) SPREAD SPECTRUM SIGNALING FOR SPEECH WATERMARKING

(75) Inventors: Qiang Cheng, Urbana, IL (US); Jeffrey Scott Sorensen, Seymour, CT (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 09/704,431

(22) Filed: Nov. 2, 2000

(51) Int. Cl.$^7$ .......................... G10L 19/14; H04B 1/69; H04L 9/00
(52) U.S. Cl. ................. 704/205; 375/141; 713/176
(58) Field of Search ................... 375/130, 141; 382/100, 240; 700/94; 704/205; 713/176

(56) References Cited

U.S. PATENT DOCUMENTS

| | | | |
|---|---|---|---|
| 5,319,735 A | | 6/1994 | Preuss et al. |
| 5,937,000 A | * | 8/1999 | Lee et al. ................... 375/141 |
| 6,061,793 A | * | 5/2000 | Tewfik et al. ............... 713/176 |
| 6,724,805 B1 | * | 4/2004 | Vigoda ....................... 375/130 |

OTHER PUBLICATIONS

Cox et al. "Secure Spread Spectrum Watermarking for Images, Audio and Video," Sep. 1996, vol. III, pp. 243–246.*
Rabiner et al. "Digital Processing of Speech Signals," Prentice–Hall, Inc. 1978, pp. 396–397.*
L. Boney et al., "Digital Watermarks for Audio Signals," Proc. of Multimedia 1996, Hiroshima, pp. 473–480, 1996.
F.J. Ruiz et al., "Digital Watermarking of Speech Signals for the National Gallery of the Spoken Word," IEEE, pp. 1499–1502, 2000.
C. Jankowski et al., "NTIMIT: A Phonetically Balanced, Continuous Speech, Telephone Bandwidth Speech Database," IEEE, pp. 109–112, 1990.
F. Hartung, "Multimedia Watermarking Techniques," Proceedings of the IEEE, vol. 87, No. 7, pp. 1079–1107, Jul. 1999.

* cited by examiner

Primary Examiner—Vijay Chawan
Assistant Examiner—V. Paul Harper
(74) Attorney, Agent, or Firm—Thu Ann Dang; Ryan, Mason & Lewis, LLP (57) ABSTRACT

Methods and apparatus for encoding an arbitrary digital message, e.g., a watermark, into a speech signal are provided. In one aspect of the invention, a method of embedding digital information in a speech signal comprises the steps of: (i) generating a spread spectrum signal, wherein the spread spectrum signal is representative of the digital information and further wherein the spread spectrum signal is within a frequency bandwidth corresponding to speech; and (ii) embedding the spread spectrum signal in the speech signal. By making use of spread spectrum technology and speech analysis techniques in the signal generation and embedding operations, respectively, significantly higher bit rates can be embedded into the speech signal without effecting the perceived quality of the recording. The invention also provides methods and apparatus for recovering the digital information embedded in the speech signal.

34 Claims, 8 Drawing Sheets

| COMPRESSION SCHEME | SPEECH BANDWIDTH | SPEECH BIT RATE | WATERMARK BIT RELIABILITY |
|---|---|---|---|
| 16 BIT LINEAR PCM | 22 kHz | 706 kbps | 74.05% |
| 16 BIT LINEAR PCM | 4 kHz | 128 kpbs | 71.58% |
| IMA ADPCM | 4 kHz | 32 kbps | 68.65% |
| GSM 6.10 | 4 kHz | 13 kpbs | 61.23% |

SPREAD SPECTRUM SIGNALING FOR SPEECH WATERMARKING

FIELD OF THE INVENTION

The present invention relates to speech signal processing and, more particularly, to methods and apparatus for watermarking of a speech signal.

BACKGROUND OF THE INVENTION

Watermarking is a technique for embedding a cryptographic signature into digital content for the purposes of detecting copying or alteration of the content. This is accomplished using coding techniques that hide data within the image or audio content in a manner not normally detectable. Thus, embedding an imperceptible, cryptographically secure signal, or watermark, is seen as a mechanism that may be used to prove ownership or detect tampering.

The technique of embedding a digital signal into an audio recording or image using techniques that render the signal imperceptible has received significant attention. For example, with respect to audio watermarking, U.S. Pat. No. 5,319,735 to Preuss et al. entitled "Embedding Signaling," the disclosure of which is incorporated by reference herein, discloses a digital information hiding technique for audio using the techniques of spread spectrum modulation. Further, L. Boeny et al., "Digital watermarks for audio signals," Proc. of Multimedia 1996, Hiroshima, 1996, the disclosure of which is incorporated by reference herein, discloses making explicit use of the MPEG-1 Psychoacoustic Model to obtain frequency masking values to achieve good imperceptibility. Recently, in R. J. Ruiz et al., "Digital watermarking of speech signals for the national gallery of the spoken word," ICASSP, Turkey, 2000, the disclosure of which is incorporated by reference herein, a speech watermarking method for application to digital speech libraries has been proposed. These methods have been extensively applied for music applications, but embed information over a very wide audio band based on human hearing capabilities. However, a potential attacker need only low-pass filter the resulting signal to remove most of the watermarking information.

While there has been a considerable amount of attention devoted to the techniques of spread-spectrum signaling for use in image and audio watermarking applications, there has only been a limited study for embedding data signals in speech, e.g., the above-mentioned R. J. Ruiz et al. reference. Speech is an uncharacteristically narrow band signal given the perceptual capabilities of the human hearing system. Speech differs from music in its acoustic characteristics and watermarking requirements. Speech is an acoustically rich signal that uses only a small portion of the human perceptual range. Typical speech reproduction hardware, although often the same as used with music, includes much lower bit rate channels such as telephone or compressed voice "vocoders."

Therefore, it would be highly advantageous to provide watermarking techniques for encoding a digital message into a speech signal such that the resulting watermarked signal is robust to speech channels.

SUMMARY OF THE INVENTION

The present invention provides methods and apparatus for encoding an arbitrary digital message, e.g., a watermark, into a speech signal. By making use of spread spectrum technology and speech analysis techniques, in accordance with the present invention, significantly higher bit rates can be embedded into the speech signal without effecting the perceived quality of the recording.

In one aspect of the invention, a method of processing digital information in accordance with a speech signal comprises the steps of: (i) generating a spread spectrum signal, wherein the spread spectrum signal is representative of the digital information and further wherein the spread spectrum signal is within a frequency bandwidth corresponding to speech; and (ii) embedding the spread spectrum signal in the speech signal. In another aspect of the invention, a processor-based apparatus may be operative to implement these and/or other operations.

The generating step/operation comprises implementing one or more selected parameters associated with the spread spectrum signal such that the spread spectrum signal is within the frequency bandwidth corresponding to speech. This may include low pass filtering the spread spectrum signal to be within the frequency bandwidth corresponding to speech; implementing a predetermined bit rate associated with the digital information such that the spread spectrum signal is within the frequency bandwidth corresponding to speech; and implementing a predetermined carrier frequency such that the spread spectrum signal is within the frequency bandwidth corresponding to speech. Also, the generating step/operation may further comprise implementing a predetermined pseudonoise sequence length.

The embedding step/operation may further comprise analyzing the speech signal using linear prediction, wherein the speech signal analysis determines one or more parameters associated with a vocal tract filter. Then, the spread spectrum signal is shaped accordingly using the vocal tract filter. The embedding step/operation may also comprise setting a gain associated with the spread spectrum signal. The gain may be determined by a fixed constant, a linear predictor residual energy value associated with the speech signal and/or a speech energy value associated with the speech signal. Preferably, the gain is determined by a linear combination of a fixed constant, a linear predictor residual energy value associated with the speech signal and a speech energy value associated with the speech signal. After the shaping and gain adjustment procedures, the embedding step/operation may then comprise adding the spread spectrum signal to the speech signal.

In yet another aspect of the invention, the digital information embedded in the speech signal may be recovered. The recovery step/operation may comprise analyzing the speech signal with the embedded spread spectrum signal using linear prediction, wherein the speech signal analysis determines one or more parameters associated with an inverse filter. Then, the speech signal with the embedded spread spectrum signal is filtered using the inverse filter. The recovery step/operation may further comprise detecting the spread spectrum signal in the speech signal, and then demodulating the spread spectrum signal to obtain the digital information. The detecting step/operation may also include the step/operation of synchronizing on a pseudonoise sequence used in generating the spread spectrum signal. Synchronization may be performed in accordance with a phase locked loop.

It is to be appreciated that the digital information is preferably a watermark. This may be a private watermark, i.e., a cryptographic signature or some cryptographically secure signal that may be used, among other things, to prove ownership or detect tampering with respect to the signal in which it is embedded. However, it is to be appreciated that the invention is not limited to embedding cryptographic signatures or cryptographically secure signals, but rather applies to the embedding of any other type of digital message in the speech signal. For example, the watermark may contain information intended to be discernible once detected, i.e., a public watermark.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative speech signal processing environment. However, while various preferred coding parameters are discussed, it is to be understood that the present invention is not limited to any particular speech signal processing environment. Rather, the invention is more generally applicable to any speech signal processing environment in which it is desirable to effectively watermark a speech signal.

For ease of reference, the remainder of the detailed description will be divided into the following sections: (I) Voiceband Spread Spectrum Signal; (II) LPC Anaylsis and Filtering; (III) Watermark Signal Gain; (IV) Watermark Detection; (V) Embedded Channel Capacity; (VI) Robustness; and (VII) Illustrative Embodiments.

I. Voiceband Spread Spectrum Signal

In contrast to previous work on audio watermarking, the speech signal is a considerably narrower bandwidth signal. The long-time-averaged power spectral density of speech indicates that the signal is confined to a range of approximately 10 Hz (Hertz) to 8 kHz (kiloHertz), see, e.g., N. S. Jayant et al., "Digital Coding of Waveforms," Prentice Hall, Inc., Englewood Cliffs, N.J., 1984. In order that the watermark survives typical transformation of speech signals, including speech codecs (coder/decoder), the watermark should be limited to the perceptually relevant portions of the spectra. However, the watermark should remain imperceptible. Therefore, in accordance with a preferred embodiment, the present invention provides for the use of a spread spectrum signal with an uncharacteristically narrow bandwidth.

Using a direct sequence spread spectrum signal, for example, such as is described in G. R. Cooper et al., "Modern Communications and Spread Spectrum," McGraw-Hill Book Company, New York, a preferred embodiment of the present invention provides for the design of a pseudonoise (PN) sequence with a main side lobe that fits within a typical telephone channel, e.g., C. Jankowski et al., "Ntimit: A phonetically balanced, continuous speech, telephone bandwidth speech database," ICASSP, pages 109–112, Albuquerque, N.Mex., 1990, which ranges from 250 Hz to 3800 kHz. As will be explained, the message sequence and the PN sequence are preferably modulated using simple Binary Phase Shift Keying (BPSK). The center frequency of the carrier may be chosen to be $f_c$=2025 Hz. The clock rate of the PN sequence, or chip rate, is preferably taken to be 1775 Hz, which is half of the signal bandwidth. Because the width of the inventive watermark is very close to the modulation frequency, it is preferred to low pass filter the spread spectrum signal before modulation to prevent excessive aliasing. For this, we have chosen to use a seventh order Butterworth filter with a cutoff of 3400 Hz.

Figure 1:
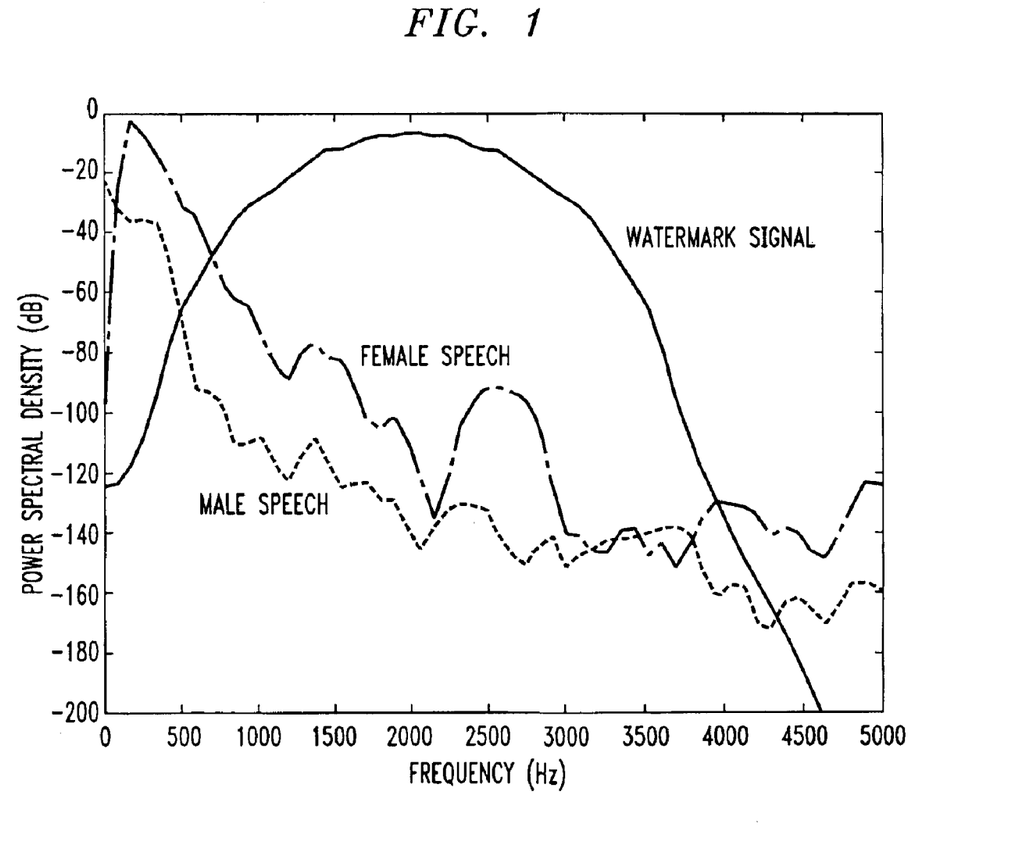
FIG. 1 is a diagram illustrating power spectral densities of a watermark signal, a male speech signal and a female speech signal.

FIG. 1 illustrates the power spectral density of the watermark signal, with the long-term average speech power spectrum (for both a male and female speaker) for illustration. The simplest implementation of a speech watermark system may involve adding this signal, which sounds primarily like radio static, to the speech signal at the appropriate gain. However, taking advantage of our knowledge of the speech signal itself, we are able to embed a significantly higher gain signal using techniques that are the subject of the next two sections.

II. LPC Anaylsis and Filtering

Our goal is to add as much watermark signal energy as possible to the speech signal, while still satisfying the constraint that the added signal not be perceivable when listened to. Most watermarking approaches rely on a perceptual model of human hearing. Speech is an inherently complex stimuli with rapidly changing spectral characteristics. Conventional masking effects are most often studied for spectral bands outside the range of speech, above 4 kHz. However, an effective production model for speech is available. The well known technique of linear prediction has proven to be highly effective in modeling speech signals. In addition, human speech perception reflects the production system characteristics. Our findings indicate that using the production model can provide excellent hiding characteristics.

In the watermark signal embedding algorithm of the invention, the watermark signal is filtered to match the overall spectral shape of the speech signal. In addition, linear predictive coding (LPC) analysis provides an effective dynamic measure of the degree of noise already present in the speech signal. Portions of speech that have a highly white spectrum, fricative sounds and the rapidly changing plosives sounds are especially good candidates for embedding additional watermark energy.

Linear predicative analysis of speech involves computing the maximum likelihood coefficients of an all-pole filter of the form:

$$A(z) = \frac{1}{a_0 + a_1 z^{-1} + \ldots + a_p z^{-p}} \quad (1)$$

There is considerable literature on the application of linear prediction to speech signals. For a preferred embodiment, we have chosen to use the Levinson-Durbin recursive technique for evaluating LPC coefficients $\alpha_i$ from the short-term autocorrelation coefficients.

The short term autocorrelation can be computed from the windowed speech frame s(t) as:

$$r_i = \sum_{n=1}^{N-1} s(n)s(n-i)$$

which:

$$\begin{bmatrix} r_0 & r_1 & \cdots & r_{p-1} \\ r_1 & r_0 & \cdots & r_{p-2} \\ \vdots & \vdots & \ddots & \vdots \\ r_{p-1} & r_{p-2} & \cdots & r_0 \end{bmatrix} \begin{bmatrix} a_1 \\ a_2 \\ \vdots \\ a_p \end{bmatrix} = \begin{bmatrix} r_1 \\ r_2 \\ \vdots \\ r_p \end{bmatrix}$$

which, in vector notation can be represented by:

$$Ra = r$$

The prediction residual energy, or the average squared-error can be computed as:

$$E = a'Ra$$

which is a measure of the "predictability" of the speech signal, and an effective measure of the noise content.

Before filtering the watermark signal using the all-pole filter, a bandwidth expansion operation is performed. This moves all of the poles closer to the center of the unit circle, increasing the bandwidth of their respective resonances. A vocal tract filter often tends to have quite narrow spectral peaks. Due to masking phenomena, sounds near these peaks are unlikely to be perceived by the listener. Therefore, by increasing the bandwidth of formant responses, larger overall watermark signal gains should be tolerable. The bandwidth parameter $\gamma$ is used to adjust the LPC coefficients:

$$\alpha'_i = \alpha_i \gamma^i$$

where $\gamma$ may be chosen between 0 and 1.

Figure 2:
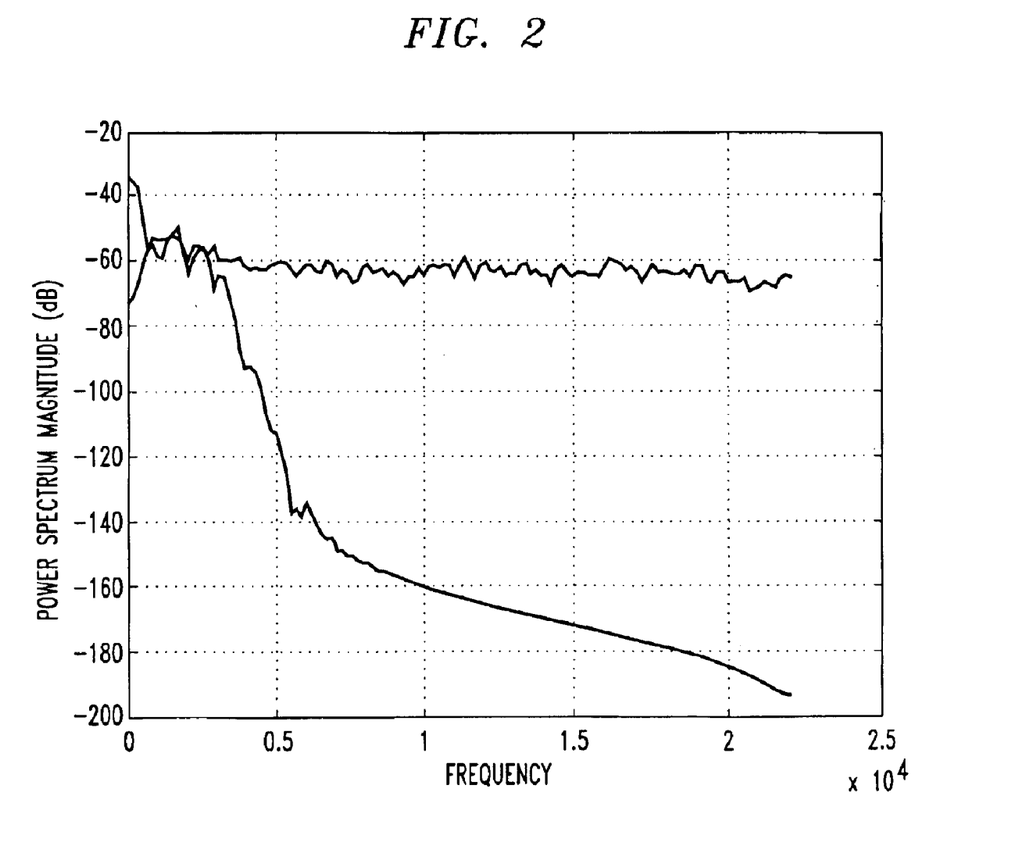
FIG. 2 is a diagram illustrating a power spectrum of a segment of speech and a spectrum of an LPC-shaped watermark signal according to an embodiment of the present invention.

FIG. 2 shows the power spectrum of a segment of speech, and the spectrum of the watermark signal that results after filtering using the spectral envelope of the speech segment.

III. Watermark Signal Gain

In accordance with the invention, the instantaneous watermark gain is dynamically determined to match the characteristics of the speech signal. In the simplest case, when little speech energy is present (i.e., during silence), the watermark may be added using a fixed gain threshold. This is selected so that the watermark becomes the effective noise floor of the recording. Perceptually, a small amount of noise is always expected in a recording and the watermark signal is not atypical of such recording noise. In many applications, silence may not be transmitted or might be by coded using extreme compression. In these circumstances, designers may preferably choose an error correcting code (such as a convolutional code) with the proper characteristics so that the message may be recovered despite these losses.

The normalized per sample speech energy $E_s$ for one frame is:

$$E_s = \frac{1}{N} \sum_{k=1}^{N} s^2(n) = \frac{1}{N} r_0.$$

Figure 3A:
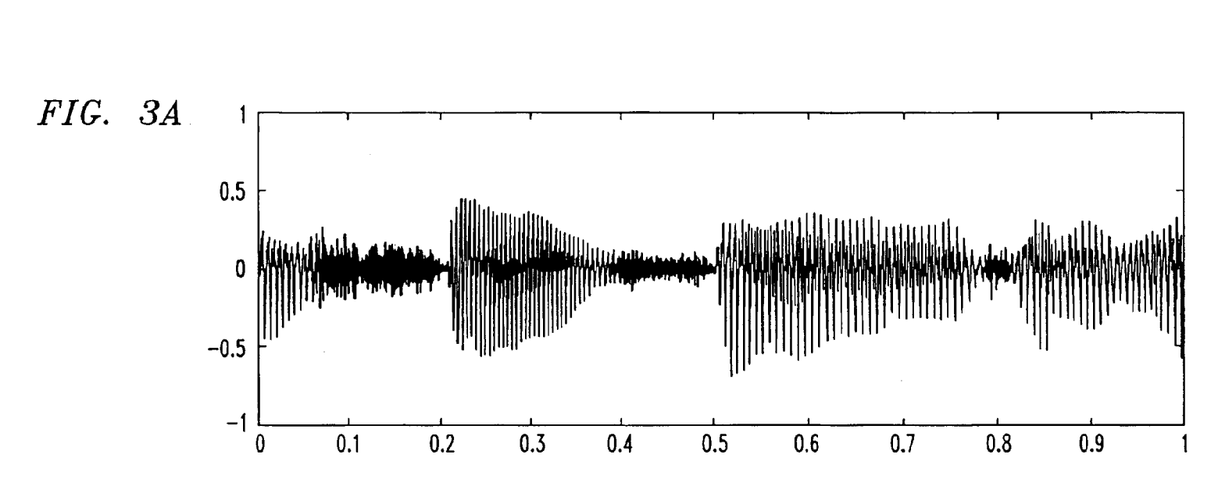
FIGS. 3A and 3B are respective diagrams illustrating a segment of speech and the corresponding watermark gains according to an embodiment of the present invention.
Figure 3B:
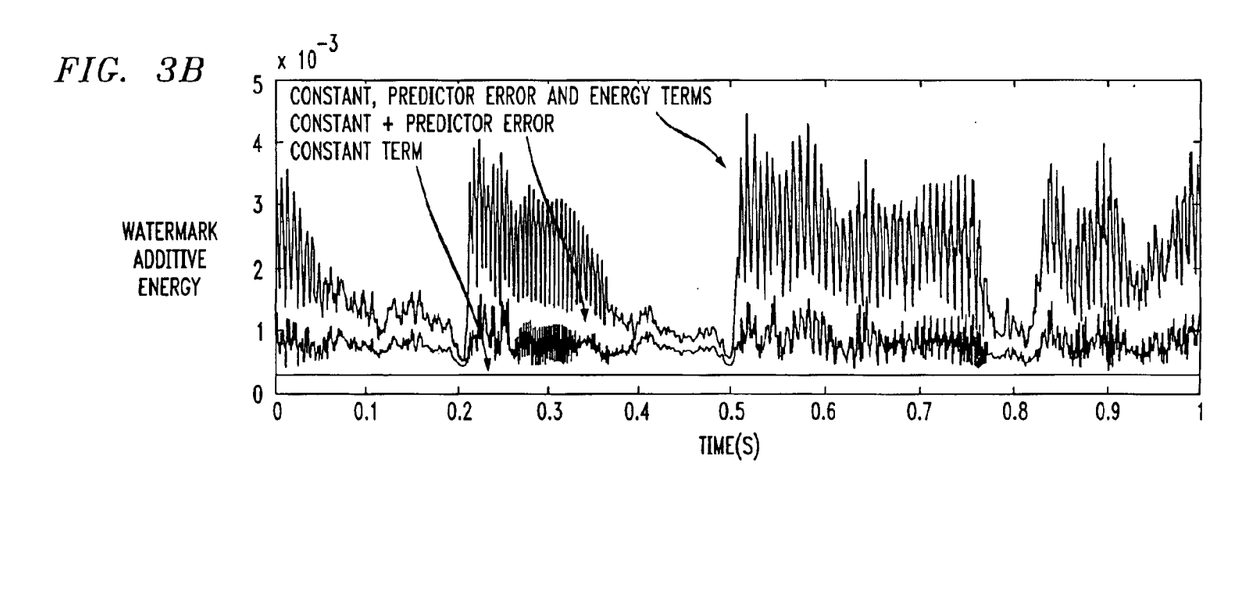

The watermark gain in each frame can be determined by the linear combination of the gains for silence, normalized per sample residual energy E, and normalized per sample speech energy $E_s$:

$$g(t) = \lambda_0 + \lambda_1 E + \lambda_2 E_s \quad (2)$$

which is designed to maximize the strength of the watermark signals without incurring perceptual degradations. It is to be appreciated that the parameters $\lambda_0$, $\lambda_1$ and $\lambda_2$ are empirically chosen parameters that serve to trade off noise versus watermark signal strength. The designer may choose these parameters depending on the particular application. FIG. 3A shows a segment of speech and FIG. 3B shows the resulting watermarked speech. A listening test demonstrates that the watermarked speech is indistinguishable from the original speech with this watermark gain. If the gain is increased further, there may be "hoarseness" in the watermarked speech. Though it hardly affects the naturalness of the voice, the difference with the original speech may indeed be perceptible.

IV. Watermark Detection

At the receiving end, the received signal $r_0(t)$ is given by:

$$r_0(t) = \sum_{t=1}^{N} w(t) + s(t) + I_0(t), \quad (3)$$

where w(t) is the LPC-shaped watermark signal, s(t) is the original speech signal, and $I_0(t)$ is some deliberated attacks or digital signal processing. We estimate the LPC coefficients from the received signal, and then take the inverse LPC filtering of $r_0(t)$ to get r(t). After inverse LPC filtering, voiced speech becomes periodic pulses, and unvoiced speech becomes whitened noise. As is typical for speech processing, we model the inverse filtered s(t) as White Gaussian Noise (WGN). Inverse LPC filtering decorrelates the speech samples s(t) as well as equalizes the watermark signal w(t). A correlation receiver:

$$\sum_{t=1}^{N} d(t) r(t) \overset{H_1}{\underset{}{\geq}} 0, \quad (4)$$

gives us optimum detection performance in AWGN (see H. V. Poor, "An Introduction to Signal Detection and Estimation," Springer-Verlag, New York, 1994), where N is the length of a frame, in which one message bit is embedded, d(t) is the despreading function, which is the synchronized, BPSK modulated spreading function for the current frame.

The correlation with d(t) can average out the interference, thus providing the desired robustness property. The decoding rule is preferably a maximum likelihood decision rule, which is also a minimum probability-of-error rule since 0 and 1 in the message are sent with equal probabilities.

When the original signal is not available, the PN sequence used in the spread spectrum modulation can be used to drive a phase locked loop during decoding. The techniques presented in G. R. Cooper et al., "Modern Communications and Spread Spectrum," McGraw-Hill Book Company, New York and/or U.S. Pat. No. 5,319,735 to R. Preuss et al. can be used in the framework of the present invention for synchronization purposes.

V. Embedded Channel Capacity

Figure 4A:
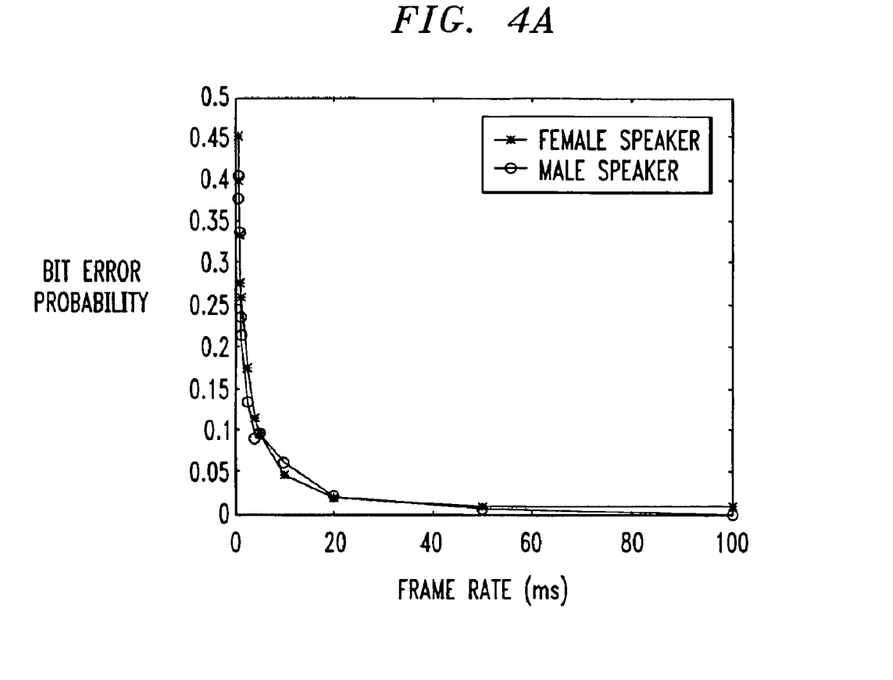
FIGS. 4A and 4B are respective diagrams illustrating bit error probability versus frame rate and bit error probability versus message bit rate according to an embodiment of the present invention.
Figure 4B:
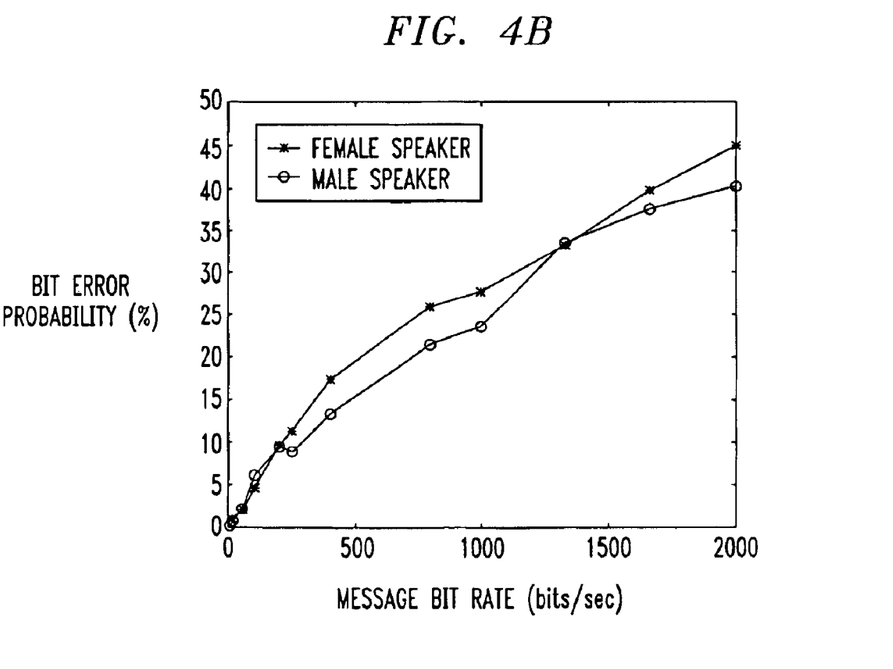

A set of simulation experiments were performed to demonstrate the relationship between the frame size and message rate (I bit per frame) and the bit error probability, as shown in FIG. 4A (Bit Error Probability versus Frame Rate) and FIG. 4B (Bit Error Probability versus Message Bit Rate).

Figure 5:
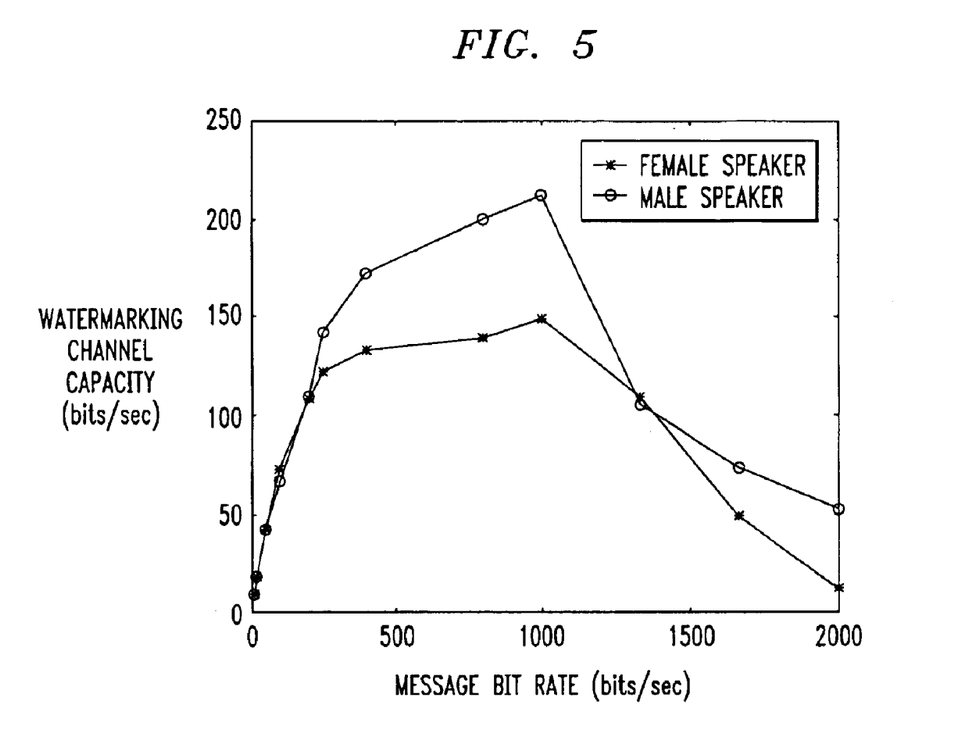
FIG. 5 is a diagram illustrating watermarking channel capacity versus message bit rate according to an embodiment of the present invention.

The spread spectrum signal, when added to the original speech, can be considered as a noisy communication channel, called the watermarking channel. The watermark is the content of the transmitted message. Without loss of generality, the message is considered to be a binary signal with equal probability for 0 and 1. The watermark channel is binary symmetric. The channel capacity, which is the theoretical maximum rate for data transmission, is defined for the watermarking channel (see, e.g., R. E. Blahut, "Principles and Practice of Information Theory," Addison-Wesley Publishing Company, 1987) as:

$$C = R(1 + p \log_2 p + (1-p)\log_2(1-p)), \quad (5)$$

where p is the crossover probability, and R is the message bit rate. The simulation results for the watermarking channel capacity are plotted in FIG. 5. For a binary symmetric channel, the channel capacity is achievable. That is, transmission codes can be designed for reliable communication under or at this rate.

The plot shows that the frame size needs to be small when high channel capacity is desired. However, the LPC prediction suffers when the frame size is too small, which makes LPC shaping less effective. Also, the degradation of the watermarking channel due to attacks is more severe for smaller frame, e.g., see next section. Therefore, there is an intrinsic tradeoff between channel capacity and survivability of watermark. To achieve high channel capacity and reasonable survivability simultaneously, in a preferred embodiment, we have chosen 800 bits per second as our message embedding rate.

VI. Robustness

Watermarked media is subject to a variety of attacks. With images, images may be cropped, rotated, filtered, or otherwise changed. Audio signals are less subject to these types of manipulations, as the human perceptual system is quite sensitive to changes in audio signals. However, speech signals may be affected by transformations that include: analog to digital and digital to analog conversions, filtering, re-equalization, changes in playback rate, and compression. The algorithm of the present invention puts all of the watermark signal in the most perceptually important areas of the speech signal. Therefore, primitive attempts to remove the watermark by filtering are almost certain to prove ineffective.

Figure 6:
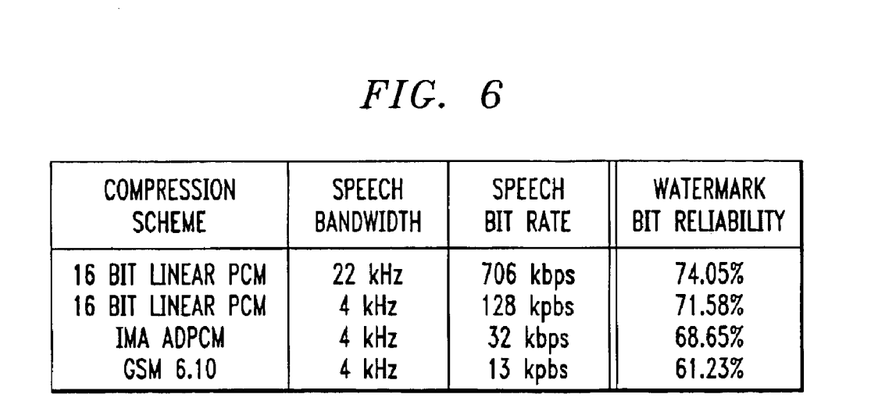
FIG. 6 is a diagram illustrating a comparison of watermarking attacks versus voice compression techniques.

In order to demonstrate the robustness of the data embedding methodology of the invention, we have used an analog reproduction system to simulate a crude attempt at duplication. A recording is made at 8 kHz, significantly reducing the bandwidth, and then the signal is re-sampled at the original rate. This could be considered similar to recording across a telephone channel, although no explicit telephone network equalization was applied. Finally, these 8 kHz recording were compressed and decompressed using the typical speech compression algorithms IMA (International Multimedia Association) ADPCM (Adaptive Delta Pulse Code Modulation) and GSM (Global System for Mobile communications) 6.10. The results are summarized in the table of FIG. 6.

VII. Illustrative Embodiments

Given the above-provided description of the speech watermarking algorithm of the invention and the speech watermark detection algorithm of the invention, the following section provides an explanation of some illustrative implementations of the techniques described above in Sections I through VI.

Figure 7:
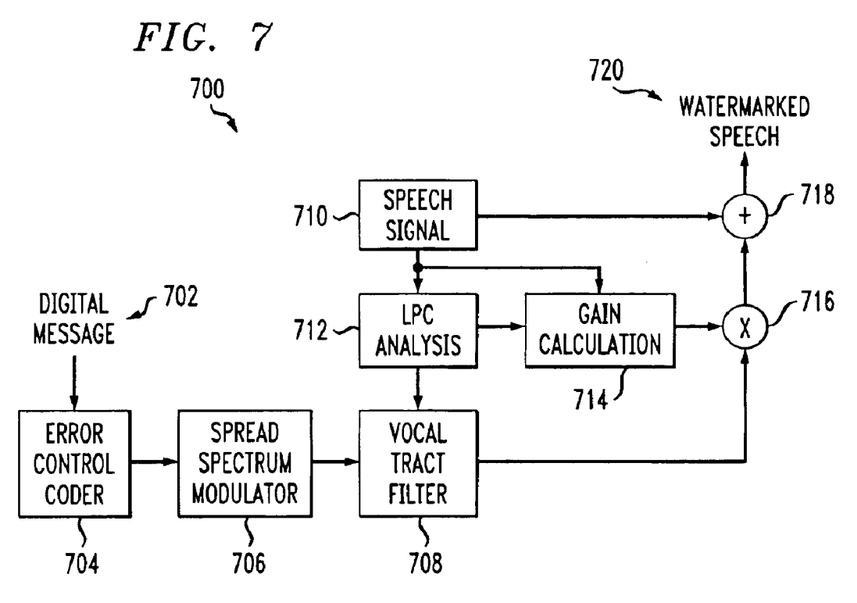
FIG. 7 is a block diagram illustrating a speech watermarking system according to an embodiment of the invention.

Referring now to FIG. 7, a block diagram illustrating a speech watermarking system according to an embodiment of the invention is shown. Generally, the system 700 inputs a digital message 702 and a speech signal 710 and embeds the digital message into the speech signal, as explained above and as will be further described below, to yield a watermarked speech signal 720. As shown in FIG. 7, the system 700 includes an error control coder 704, a spread spectrum modulator 706, a vocal tract filter 708, an LPC analysis module 712, a gain calculation module 714, a signal multiplier 716 and a signal adder 718.

The digital message 702 is preferably a cryptographic signature or some cryptographically secure signal (i.e., watermark) that may be used, among other things, to prove ownership or detect tampering with respect to the signal in which it is embedded. However, it is to be appreciated that the invention is not limited to embedding cryptographic signatures or cryptographically secure signals, but rather applies to the embedding of any other type of digital message in the speech signal.

The digital message 702 is first provided to the error control coder 704. The error control coder uses an encoding scheme to make an unreliable channel reliable by spreading information among may bits. A Reed-Solomon code is one example of such an encoding scheme, also see, e.g., R. E. Blahut, "Principles and Practice of Information Theory," Addison-Wesley Publishing Company, 1987.

Next, the digital message is provided to the spread spectrum modulator 706. As previously mentioned, in accordance with a preferred embodiment, the present invention provides for the use of a spread spectrum signal with an uncharacteristically narrow bandwidth. This is preferably achieved by using a direct sequence spread spectrum signal. As explained above in Section I, a preferred embodiment of the present invention provides for the design of a pseudonoise (PN) sequence with a main side lobe that fits within a typical telephone channel which ranges from 250 Hz to 3800 kHz. The message sequence and the PN sequence are preferably modulated using simple Binary Phase Shift Keying (BPSK). The center frequency of the carrier may be chosen to be $f_c = 2025$ Hz. The clock rate of the PN sequence, or chip rate, is preferably taken to be 1775 Hz, which is half of the signal bandwidth. Because the width of the inventive watermark is very close to the modulation frequency, it is preferred to low pass filter the spread spectrum signal before modulation to prevent excessive aliasing. For this, we have chosen to use a seventh order Butterworth filter with a cutoff of 3400 Hz. Recall that FIG. 1 illustrates the power spectral density of the watermark signal, with the long-term average speech power spectrum (for both a male and female speaker)

for illustration. An example of a spread spectrum modulator which may be used is explained below in the context of FIG. 8. It is to be understood that the output of the spread spectrum modulator 706 is the watermark signal that is to be embedded into the speech signal 710. The watermark signal is then provided to the vocal tract filter 708.

Turning now to the speech signal 710, the speech signal is processed by the LPC analysis module 712, the output of which is also provided to the vocal tract filter 708. The LPC analysis and vocal tract filter operations are explained in detail in Section II above. As mentioned therein, a goal of the invention is to add as much watermark signal energy as possible to the speech signal, while still satisfying the constraint that the added signal not be perceivable when listened to. According to the invention, this may be achieved by employing LPC which is highly effective in modeling speech signals. The invention therefore uses LPC since a speech production model can provide excellent hiding characteristics. LPC analysis of speech involves computing the maximum likelihood coefficients of an all-pole filter of the form shown above in equation (1). Before filtering the watermark signal using the all-pole filter, a bandwidth expansion operation is performed. This moves all of the poles closer to the center of the unit circle, increasing the bandwidth of their respective resonances. This is performed in the LPC analysis module 712. The output of the LPC analysis module is provided to the vocal tract filter 708. Thus, the vocal tract filter 708 represents A(z) of equation (1) as described above in Section II, where the $\alpha_i$ values are estimated from the speech signal 710 by the LPC analysis module 712. Accordingly, the vocal tract filter 708, driven by the results of the LPC analysis, filters the watermark signal output by the spread spectrum modulator 706.

The gain calculation module 714 is used to dynamically determined the instantaneous watermark gain in order to match the characteristics of the speech signal. The operations of the gain calculation module are described in detail above in Section III. As mentioned therein, the watermark gain in each frame of the speech signal can be determined by the linear combination of the gains for silence, normalized per sample residual energy E, and normalized per sample speech energy E, as specified in equation (2). The gain calculation operation is designed to maximize the strength of the watermark signals without incurring perceptual degradations. The gain calculation module outputs a gain control signal for each frame of the speech signal in the manner described above with respect to equation (2).

The output of the vocal tract filter 708 is provided to the signal multiplier 716 along with the gain control signal generated by the gain calculation module 714. The signal multiplier adjusts the gain of the watermark signal in accordance with the gain control signal generated in accordance with the computation performed by the gain calculation module 714. Lastly, the output of the signal multiplier 716 is added to the speech signal 710 in the signal adder 718 to yield the watermarked speech signal 720.

Figure 8:
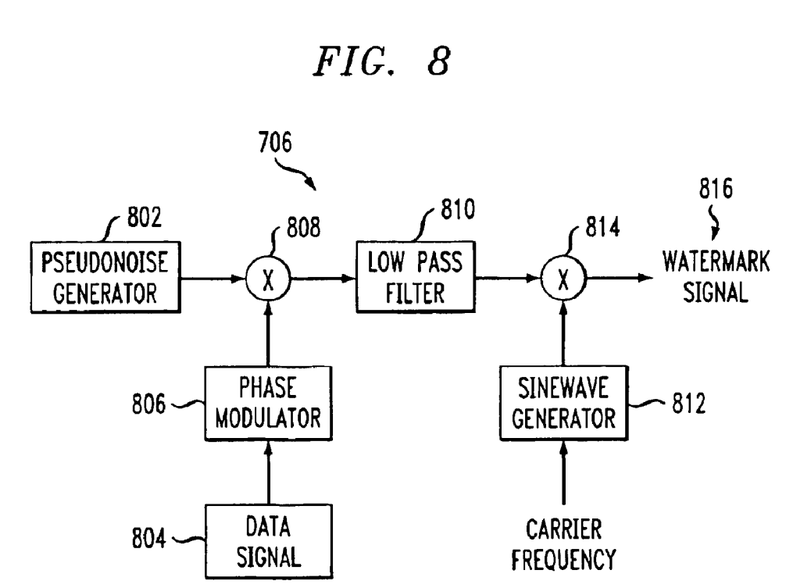
FIG. 8 is a block diagram illustrating a spread spectrum modulator according to an embodiment of the invention.

Referring to FIG. 8, a block diagram illustrating a spread spectrum modulator according to an embodiment of the invention is shown. The spread spectrum modulator 706 shown in FIG. 8 is an example of a modulator that may be employed to achieve the characteristics of a preferred watermark signal as described above. The spread spectrum modulator 706 receives as input a data signal 804. It is to be appreciated that the data signal 804 represents the digital message 702 (FIG. 7) after it has been processed by the error control coder 704 (FIG. 7). As shown, the spread spectrum modulator 706 includes a pseudonoise generator 802, a phase modulator 806, a first signal multiplier 808, a low pass filter 810, a sinewave generator 812 and a second signal multiplier 814.

The pseudonoise generator 802 generates a pseudonoise (PN) sequence which is mixed in the signal multiplier 808 with the signal output by the phase modulator 806. In a preferred embodiment, the PN sequence is an "m-sequence" of length 7. Such a sequence type is well known in the art, see, e.g., G. R. Cooper et al., "Modern Communications and Spread Spectrum," McGraw-Hill Book Company, New York. For higher security applications, longer and/or more sophisticated PN sequence schemes may be employed. It is to be appreciated that the length of the PN sequence determines how difficult it is to synchronize a phase locked loop in the watermark detection system (as will be explained in detail below in the context of FIGS. 10 and 11). The shorter the length of the sequence, the more error feedback and the faster the lock.

The signal output by the phase modulator 806 is a phase-modulated representation of the data signal 804, i.e., the phase-modulated digital message. The output of the signal multiplier 808 is thus a PN sequence modulated by the phase-modulated digital message. As mentioned, the message sequence and the PN sequence are preferably modulated using simple Binary Phase Shift Keying (BPSK). The signal output by the signal multiplier 808 is then filtered in the low pass filter 810. As mentioned above in Section I, because the width of the watermark is very close to the modulation frequency, it is preferred to low pass filter the spread spectrum signal (watermark signal) before modulation by the carrier frequency to prevent excessive aliasing. Preferably, a seventh order Butterworth filter with a cutoff of 3400 Hz may be used as the low pass filter 810. The filtered signal output by the low pass filter 810 is then modulated in the signal multiplier 814 by a sinewave signal generated by the sinewave generator 812 at a predetermined carrier frequency. For example, the center frequency of the carrier may be chosen to be $f_c$=2025 Hz. The resulting signal output by the signal multiplier 814 is the watermark signal 816 to be provided to the vocal tract filter 708 (FIG. 7).

Figure 9:
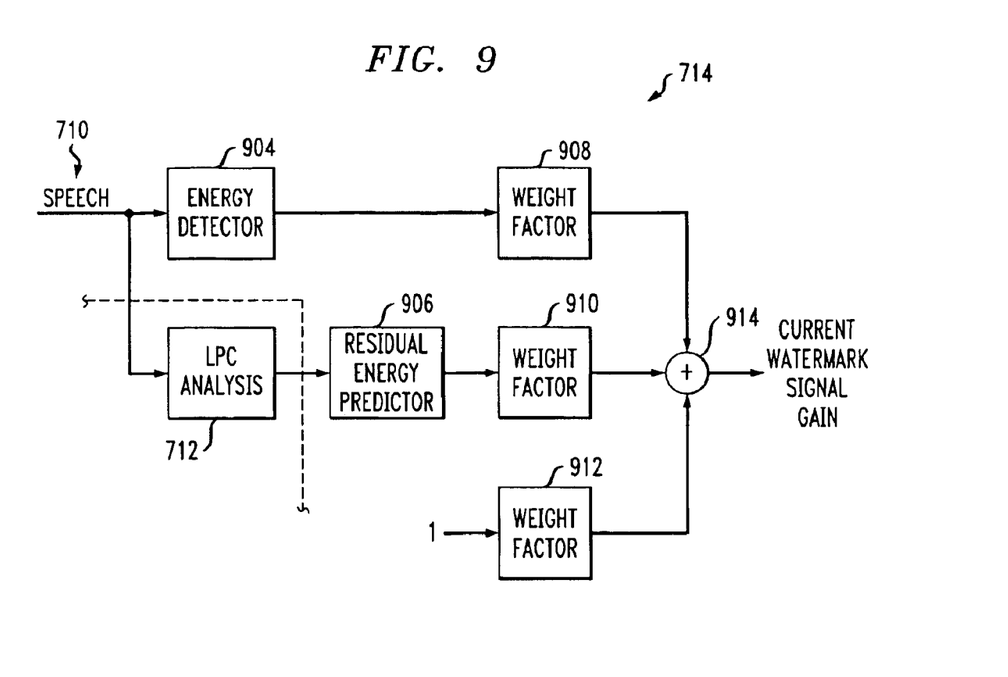
FIG. 9 is a block diagram illustrating a gain calculation module according to an embodiment of the invention.

Referring now to FIG. 9, a block diagram illustrating a gain calculation module according to an embodiment of the invention is shown. The gain calculation module 714 shown in FIG. 9 is an example of a gain calculation module that may be employed to generate a gain control signal for affecting gain adjustment of the watermark signal as described above. The gain calculation module 714 receives as input the speech signal 710 (FIG. 7) and the output from the LPC module 712 (which is also illustrated in FIG. 9 for ease of reference but which is not necessarily considered part of the gain calculation module as denoted by the phantom line around the LPC block). As shown, the gain calculation module 714 includes an energy detector 904, a residual energy predictor 906, weight factor units 908, 910 and 912, and a signal adder 914.

As mentioned above, the watermark gain in each frame of the speech signal can be determined by the linear combination of the gains for silence, normalized per sample linear predictor residual energy E, and normalized per sample speech energy $E_s$ as specified in equation (2). As is evident from FIG. 9, the energy detector 904 and the weight factor unit 908 yield the gain contribution associated with normalized per sample speech energy $E_s$ from the speech signal 710; the residual energy predictor 906 and the weight factor unit 910 yield the gain contribution associated with the normalized per sample residual energy E from the output of the LPC analysis module 712; and the weight factor unit 912 yields a gain contribution representing silence (i.e., a fixed threshold generated by applying a unity input to the weight factor unit 912). The gain contribution outputs of all the weight factor units are then linearly combined in signal adder 914 to yield the watermark signal gain for the current frame of the speech signal. In this manner, the gain calculation operation is designed to maximize the strength of the watermark signal without incurring perceptual degradations. As noted in the description of FIG. 7, the gain control signal output by the signal adder 914 representing the current watermark signal gain is applied to the watermark signal before the watermark signal is embedded into the speech signal.

Figure 10:
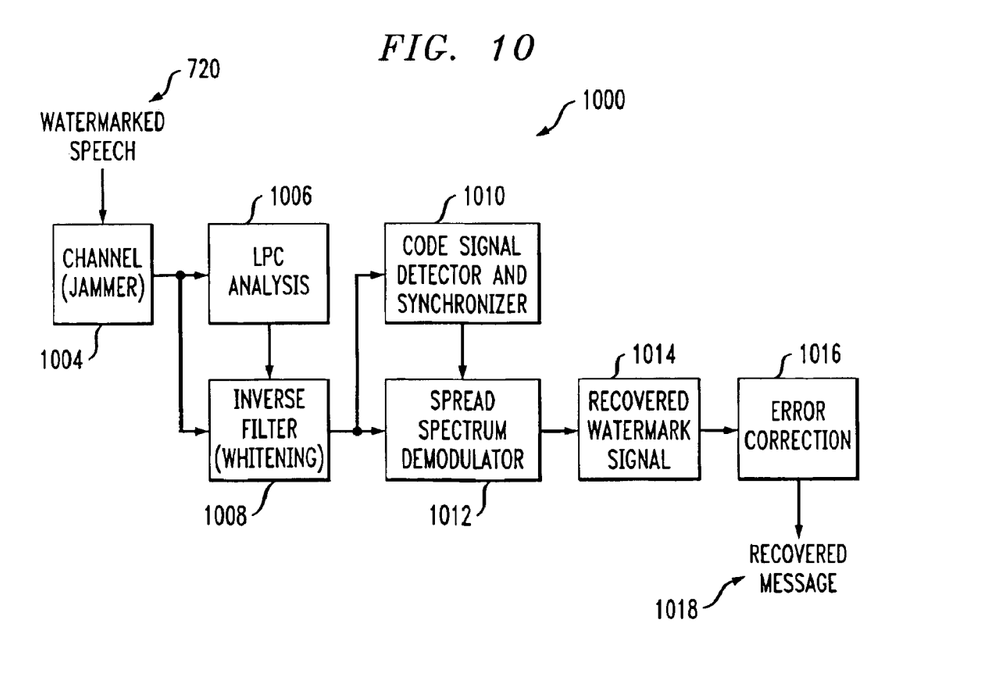
FIG. 10 is a block diagram illustrating a speech watermark detection system according to an embodiment of the invention.

Turning now to FIG. 10, a block diagram illustrating a speech watermark detection system according to an embodiment of the invention is shown. Generally, the detection system 1000 inputs a speech signal watermarked in accordance with the invention (e.g., the watermarked speech signal 720 generated by the speech watermarking system 700 as shown in FIG. 7) and recovers the embedded digital message 1018 from the received speech, as explained above and as will be further described below. As shown in FIG. 10, the system 1000 includes an LPC analysis module 1006, an inverse filter 1008, a code signal detector and synchronizer 1010, a spread spectrum demodulator 1012 and an error correction module 1016. Also, shown at the input to the detection system 1000 is a channel (or jammer) 1004. The channel represents the medium through which the watermarked signal 720 passes before being received by the detection system 1000. The channel may be jammed by an adversary, in which case block 1004 represents a person, i.e., a jammer, trying to remove the watermark from the watermarked speech signal.

As described in detail above in Section IV, watermark detection is applied to the signal received from the channel 1004. The signal received by the detection system 1000 is specified in equation (3) above and represented as $r_0(t)$ having components w(t), s(t) and $I_0(t)$, where w(t) is the LPC-shaped watermark signal, s(t) is the original speech signal, and $I_0(t)$ is some deliberated attacks or digital signal processing.

In the LPC analysis module 1006, the LPC coefficients are estimated from the received signal. Then, in the filter 1008, the inverse LPC filtering of $r_0(t)$ is taken to yield r(t) in accordance with the LPC coefficients. It is to be appreciated that the LPC coefficients of the received signal may differ slightly from the LPC coefficients computed in the embedding calculation (block 712 of FIG. 7). However, this is normal. After inverse LPC filtering, voiced speech becomes periodic pulses, and unvoiced speech becomes whitened noise. As is typical for speech processing, we model the inverse filtered s(t) as White Gaussian Noise (WGN). Inverse LPC filtering decorrelates the speech samples s(t) as well as equalizes the watermark signal w(t).

Next, r(t) representing the watermarked speech signal is applied to the code signal detector and synchronizer 1010 and the spread spectrum demodulator 1012 whose functions are explained in more detail below in the context of FIG. 11. Generally, the code signal detector and synchronizer 1010 inputs the watermarked speech signal and outputs a synchronized pseudonoise signal, and the spread spectrum demodulator 1012 receives the synchronized pseudonoise signal and the watermarked speech signal and outputs the demodulated digital watermark message.

Thus, the output of the spread spectrum demodulator 1012 is the recovered watermark signal 1014. After performing an error correction operation on the recovered signal in the error correction module 1016, the detection system outputs a signal 1018 representing the digital message originally embedded in the speech signal by the watermarking system 700 (FIG. 7).

Figure 11:
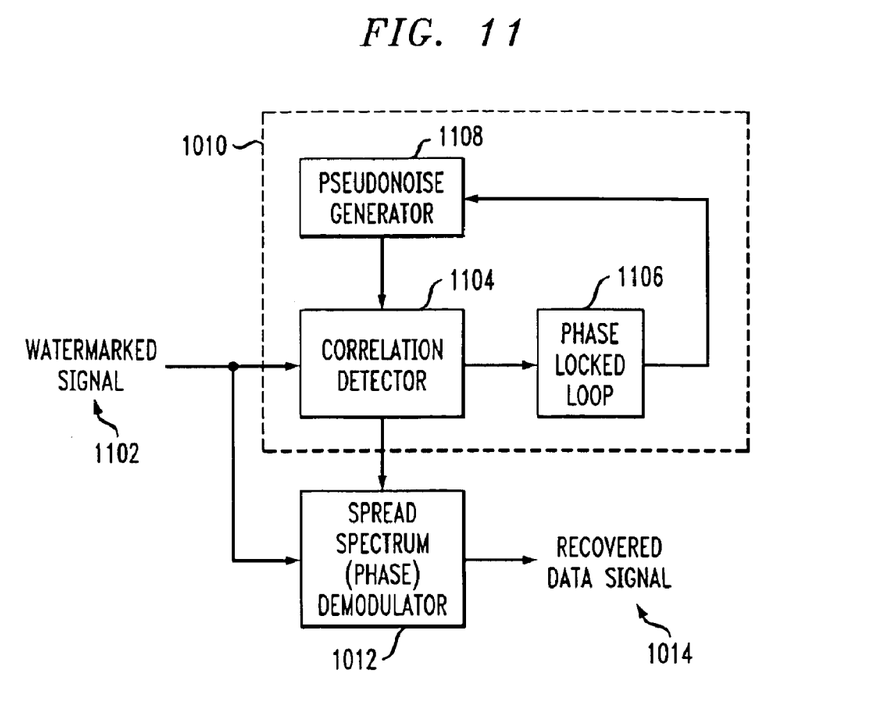
FIG. 11 is a block diagram illustrating a code signal detector and synchronizer and a spread spectrum demodulator arrangement according to an embodiment of the invention.

Referring now to FIG. 11, a block diagram illustrating a code signal detector and synchronizer and a spread spectrum demodulator arrangement according to an embodiment of the invention is shown. Specifically, FIG. 111 shows illustrative details of the code signal detector and synchronizer 1010 (FIG. 10). Also shown in FIG. 11 is the spread spectrum demodulator 1012 (FIG. 10). One of ordinary skill in the art will realize that the spread spectrum demodulator 1012 is employed to demodulate the watermark embedded in the signal received by the detection system 1000 in correspondence with the modulation scheme employed in the spread spectrum modulator 706 (FIG. 7) of the speech watermarking system 700 (FIG. 7). Given the above details and explanation of the modulation scheme, the demodulation scheme may be realized in a straightforward manner and therefore is not further illustrated.

As shown in FIG. 11, the code signal detector and synchronizer 1010 includes a correlation detector 1104, a phase locked loop 1106 and a pseudonoise generator 1108. The detector and synchronizer 1010 receives as input the watermarked signal 1102, i.e., the speech signal with embedded watermark. It is to be appreciated that the correlation detector 1104, the phase locked loop 1106 and the pseudonoise generator 1108 form an error feedback loop which enables the detector and synchronizer block to find and lock onto the watermark signal embedded in the speech signal. Because the watermark contains a PN sequence which has particular autocorrelation properties dictated by the speech watermarking system 700 (FIG. 7), the detector and synchronizer block may find and lock onto this noise-like signal. In the case where the original PN signal is not available, the PN generator 1108 is used to generate a PN sequence. This PN sequence drives the correlation detector 1104 until the correct PN sequence (i.e., the same PN sequence generated in the spread spectrum modulation process) is locked onto. Once signal lock is achieved, the PN generator outputs the synchronized PN signal to the correlation detector which then detects the phase modulated data signal (i.e., watermark). The detected signal is then provided to the spread spectrum (phase) demodulator 1012 which, in accordance with the spread spectrum coding scheme, demodulates the watermark signal to yield the recovered data signal 1014 (FIG. 10).

Figure 12:
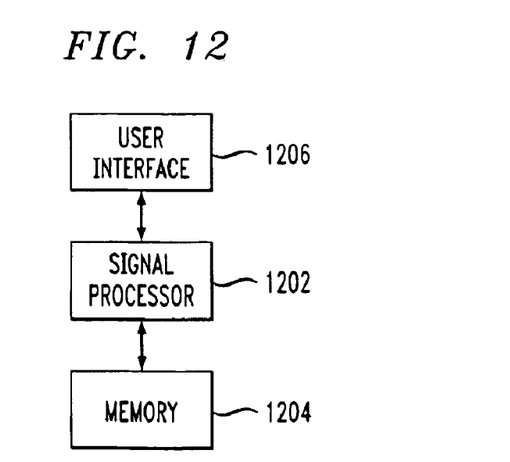
FIG. 12 is a block diagram of an illustrative hardware implementation that may be employed for a watermarking system and/or a watermark detection system according to the invention.

Referring now to FIG. 12, a block diagram of an illustrative hardware implementation that may be employed for a speech watermarking system and/or a speech watermark detection system according to the invention (e.g., as illustrated in FIGS. 7 and 10) is shown. In this particular implementation, a processor 1202 for controlling and performing speech watermarking and/or speech watermark detecting is coupled to a memory 1204 and a user interface 1206. It is to be appreciated that the term "processor" as used herein is intended to include any processing device, such as, for example, one that includes a CPU (central processing unit) or other suitable processing circuitry. For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "user interface" as used herein is intended to include, for example, one or more input devices, e.g., keyboard, for inputting data to the processing unit (e.g., digital message to be embedded), and/or one or more output devices, e.g., CRT display and/or printer, for providing results associated with the processing unit. The user interface 1206 may also include a microphone for receiving a speech signal to be watermarked and a speaker for listening to the watermarked speech signal.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 7 and 10 (as well as FIGS. 8, 9 and 11) may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

The present invention provides a technique for embedding an arbitrary message in a speech signal. In order to provide a complete watermarking application, one must choose a message that provides the appropriate cryptographic properties, such as proof of authenticity or ownership. In this respect, the embedding algorithm presented herein can be used with nearly any comparable application. For example, it can be applied to the copyright of the language-learning CD's, audio books, recorded teleconferencing data, digital speech libraries (see, e.g., R. J. Ruiz et al., "Digital watermarking of speech signals for the national gallery of the spoken word," ICASSP, Turkey, 2000), Internet radio broadcasts, covert communication channels, etc. The embedded information may be any digital message. Messages that can be used to prove authorship require the generation of an appropriate cryptographically secure digital message and are beyond the scope of the invention. However, one skilled in the art may refer to F. Hartung et al., "Multimedia watermarking techniques," Proceedings of the IEEE, vol. 87, July 1999 for information on the application of watermarks.

In addition, the speech data embedding algorithm of the invention suggests some new and possibly unique applications. For example, a closed captioning system can be built using the data embedding algorithm presented herein, where the text transcription of the speech would be hidden in the speech itself. In addition, in-band signaling applications, typically done using dual tone "touch-tone" signals can be replaced with embedded control signals, suggesting novel simultaneous voice and data applications. For the purpose of side-information embedding, there is little threat from intentional attacks. Thus, a larger capacity of information can be communicated with less dependency on the redundancy of error correct codings.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of processing digital information in accordance with a speech signal, the method comprising the steps of:

generating a spread spectrum signal, wherein the spread spectrum signal is representative of the digital information and further wherein the generating step comprises implementing a predetermined modulation carrier frequency such that the spread spectrum signal is within a frequency bandwidth corresponding to speech; and embedding the spread spectrum signal in the speech signal.

2. The method of claim 1, wherein the generating step comprises the step of implementing one or more selected parameters associated with the spread spectrum signal such that the spread spectrum signal is within the frequency bandwidth corresponding to speech.

3. The method of claim 2, wherein the generating step further comprises the step of low pass filtering the spread spectrum signal to be within the frequency bandwidth corresponding to speech.

4. The method of claim 2, wherein the generating step further comprises the step of implementing a predetermined bit rate associated with the digital information such that the spread spectrum signal is within the frequency bandwidth corresponding to speech.

5. The method of claim 2, wherein the generating step further comprises the step of implementing a predetermined pseudonoise sequence length.

6. The method of claim 1, wherein the embedding step further comprises the steps of:

analyzing the speech signal using linear prediction, the speech signal analysis determining one or more parameters associated with a vocal tract filter; and shaping the spread spectrum signal using the vocal tract filter.

7. The method of claim 6, wherein the embedding step further comprises the step of setting a gain associated with the spread spectrum signal.

8. The method of claim 7, wherein the gain is determined by at least one of a fixed constant, a linear predictor residual energy value associated with the speech signal and a speech energy value associated with the speech signal.

9. The method of claim 7, wherein the gain is determined by a linear combination of a fixed constant, a linear predictor residual energy value associated with the speech signal and a speech energy value associated with the speech signal.

10. The method of claim 7, wherein the embedding step further comprises the step of adding the spread spectrum signal to the speech signal.

11. The method of claim 1, further comprising the step of recovering the digital information embedded in the speech signal.

12. The method of claim 11, wherein the recovery step comprises the steps of:

analyzing the speech signal with the embedded spread spectrum signal using linear prediction, the speech signal analysis determining one or more parameters associated with an inverse filter; and filtering the speech signal with the embedded spread spectrum signal using the inverse filter.

13. The method of claim 12, wherein the recovery step comprises the steps of:

detecting the spread spectrum signal in the speech signal; and demodulating the spread spectrum signal to obtain the digital information.

14. The method of claim 13 wherein the recovery step further comprises the step of synchronizing on a pseudonoise sequence used in generating the spread spectrum signal.

15. The method of claim 14, wherein the synchronizing step is performed in accordance with a phase locked loop.

16. The method of claim 1, wherein the digital information is a watermark.

17. Apparatus for processing digital information in accordance with a speech signal, the apparatus comprising:

at least one processor operative to: (i) generate a spread spectrum signal, wherein the spread spectrum signal is representative of the digital information and further wherein the generating operation comprises implementing a predetermined modulation carrier frequency such that the spread spectrum signal is within a frequency bandwidth corresponding to speech; and (ii) embed the spread spectrum signal in the speech signal.

18. The apparatus of claim 17, wherein the generating operation comprises implementing one or more selected parameters associated with the spread spectrum signal such that the spread spectrum signal is within the frequency bandwidth corresponding to speech.

19. The apparatus of claim 18, wherein the generating operation further comprises low pass filtering the spread spectrum signal to be within the frequency bandwidth corresponding to speech.

20. The apparatus of claim 18, wherein the generating operation further comprises implementing a predetermined bit rate associated with the digital information such that the spread spectrum signal is within the frequency bandwidth corresponding to speech.

21. The apparatus of claim 18, wherein the generating operation further comprises implementing a predetermined pseudonoise sequence length.

22. The apparatus of claim 17, wherein the embedding operation further comprises analyzing the speech signal using linear prediction, the speech signal analysis determining one or more parameters associated with a vocal tract filter, and shaping the spread spectrum signal using the vocal tract filter.

23. The apparatus of claim 22, wherein the embedding operation further comprises setting a gain associated with the spread spectrum signal.

24. The apparatus of claim 23, wherein the gain is determined by at least one of a fixed constant, a linear predictor residual energy value associated with the speech signal and a speech energy value associated with the speech signal.

25. The apparatus of claim 23, wherein the gain is determined by a linear combination of a fixed constant, a linear predictor residual energy value associated with the speech signal and a speech energy value associated with the speech signal.

26. The apparatus of claim 23, wherein the embedding operation further comprises adding the spread spectrum signal to the speech signal.

27. The apparatus of claim 17, wherein the at least one processor is further operative to recover the digital information embedded in the speech signal.

28. The apparatus of claim 27, wherein the recovery operation comprises analyzing the speech signal with the embedded spread spectrum signal using linear prediction, the speech signal analysis determining one or more parameters associated with an inverse filter, and filtering the speech signal with the embedded spread spectrum signal using the inverse filter.

29. The apparatus of claim 28, wherein the recovery operation comprises detecting the spread spectrum signal in the speech signal, and demodulating the spread spectrum signal to obtain the digital information.

30. The apparatus of claim 29, wherein the recovery operation further comprises synchronizing on a pseudonoise sequence used in generating the spread spectrum signal.

31. The apparatus of claim 30, wherein the synchronizing operation is performed in accordance with a phase locked loop.

32. The apparatus of claim 17, wherein the digital information is a watermark.

33. Apparatus for embedding digital information in a speech signal, the apparatus comprising:

at least one processor operative to: (i) generate a spread spectrum signal, wherein the spread spectrum signal is representative of the digital information and further wherein the generating operation comprises implementing a predetermined modulation carrier frequency such that the spread spectrum signal is within a frequency bandwidth corresponding to speech; and (ii) embed the spread spectrum signal in the speech signal.

34. Apparatus for recovering digital information embedded in a speech signal, the apparatus comprising:

at least one processor operative to: (i) obtain a speech signal having a spread spectrum signal embedded therein, wherein the spread spectrum signal is representative of the digital information and generated by implementing a predetermined modulation carrier frequency such that the spread spectrum signal is within a frequency bandwidth corresponding to speech prior to embedding the spread spectrum signal in the speech signal; (ii) analyze the speech signal with the embedded spread spectrum signal using linear prediction, the speech signal analysis determining one or more parameters associated with an inverse filter; (iii) filter the speech signal with the embedded spread spectrum signal using the inverse filter; (iv) detect the spread spectrum signal in the speech signal; and (v) demodulate the spread spectrum signal to obtain the digital information.

* * * * *